US009897693B2

(12) United States Patent
Cho et al.

(10) Patent No.: US 9,897,693 B2
(45) Date of Patent: Feb. 20, 2018

(54) METHOD AND APPARATUS USING LIGHT AMOUNT VALUES AND DETERMINED WEIGHT VALUE FOR CONTROLLING GESTURE SENSOR

(71) Applicant: Samsung Electronics Co., Ltd., Suwon-si, Gyeonggi-do (KR)

(72) Inventors: Jeong-Ho Cho, Suwon-si (KR); Seung-Geol Baek, Daegu (KR); Dong-Han Lee, Suwon-si (KR); Jae-Yub Kim, Yongin-si (KR); Jong-Woo Kim, Seoul (KR); Ki-Hong Min, Seoul (KR); Hyeon-Chang Son, Seongnam-si (KR); Ki-Hun Eom, Suwon-si (KR); Kyeong-Mun Jo, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 302 days.

(21) Appl. No.: 14/693,266

(22) Filed: Apr. 22, 2015

(65) Prior Publication Data
US 2015/0309164 A1    Oct. 29, 2015

(30) Foreign Application Priority Data
Apr. 23, 2014  (KR) .......................... 10-2014-0048787

(51) Int. Cl.
*G01S 7/497*    (2006.01)
*G06F 3/038*    (2013.01)
(Continued)

(52) U.S. Cl.
CPC .............. *G01S 7/497* (2013.01); *G01S 7/493* (2013.01); *G01S 17/026* (2013.01); *G06F 3/017* (2013.01);
(Continued)

(58) Field of Classification Search
CPC ........ G01S 7/497; G01S 7/493; G01S 17/026; G06F 3/038; G06F 3/0304; G06F 3/017; H04M 1/72519; H04M 2250/12; G06K 9/00335
USPC ........... 250/208.1, 221, 214 C, 214 AL, 216; 345/173, 175, 179; 348/169; 715/863, 715/862
See application file for complete search history.

(56) References Cited

U.S. PATENT DOCUMENTS 7,894,715 B2 * 2/2011 Osawa .................... G03B 15/02
                                                            396/157
9,430,091 B2 * 8/2016 Lu ............................ G06F 3/042
(Continued)

FOREIGN PATENT DOCUMENTS

KR     10-2013-0118918 A    10/2013

*Primary Examiner* — Que T Le
*Assistant Examiner* — Jennifer Bennett
(74) *Attorney, Agent, or Firm* — Jefferson IP Law, LLP

(57) ABSTRACT

An electronic device and a method for controlling a gesture sensor of the same are provided. The electronic device includes a gesture sensor and a threshold determining module configured to receive a light amount measurement with respect to light incident to the gesture sensor, to compare the light amount measurement with a light amount reference value, and to determine a light amount threshold that is used based on object recognition of the gesture sensor by adding the weight value to the light amount measurement.

19 Claims, 7 Drawing Sheets

(51) Int. Cl.
*G06F 3/03* (2006.01)
*H04M 1/725* (2006.01)
*G06F 3/01* (2006.01)
*G01S 7/493* (2006.01)
*G01S 17/02* (2006.01)

(52) U.S. Cl.
CPC ............ *G06F 3/0304* (2013.01); *G06F 3/038* (2013.01); *H04M 1/72519* (2013.01); *H04M 2250/12* (2013.01)

(56) References Cited

U.S. PATENT DOCUMENTS

| | | | |
|---|---|---|---|
| 2012/0033205 A1* | 2/2012 | Awaji | G01L 9/0077 356/73.1 |
| 2012/0172085 A1 | 7/2012 | Vuppu et al. | |
| 2013/0153753 A1* | 6/2013 | Hung | G01J 1/18 250/208.2 |
| 2013/0169947 A1* | 7/2013 | Hakim | G01N 21/53 356/3.1 |
| 2013/0182246 A1* | 7/2013 | Tanase | G06F 3/042 356/218 |
| 2014/0027606 A1* | 1/2014 | Raynor | G06F 3/0421 250/205 |

\* cited by examiner

METHOD AND APPARATUS USING LIGHT AMOUNT VALUES AND DETERMINED WEIGHT VALUE FOR CONTROLLING GESTURE SENSOR

CROSS-REFERENCE TO RELATED APPLICATION(S)

This application claims the benefit under 35 U.S.C. § 119(a) of a Korean patent application filed on Apr. 23, 2014 in the Korean Intellectual Property Office and assigned Serial number 10-2014-0048787, the entire disclosure of which is hereby incorporated by reference.

TECHNICAL FIELD

The present disclosure relates to a method and an apparatus for controlling a gesture sensor. More particularly, the present disclosure relates to a method for preventing a malfunction of a gesture sensor.

BACKGROUND

A gesture sensor is a sensor used to detect presence or absence, passage, continuous flow, and accumulation of an object and control a position of the object, by using a force of an electromagnetic field without physical contact. Depending on the principles of detection, the gesture sensor may be classified into a magnetic gesture sensor, an optical gesture sensor, an ultrasonic gesture sensor, an inductive gesture sensor, a capacitive gesture sensor, an eddy-current gesture sensor, and the like.

Among the above-listed sensors, the optical gesture sensor includes a light source (located outside or inside the sensor) called an emitter and a light-receiver for detecting presence or absence of light. Generally, the light-receiver is a photo-diode and the emitter is a Light-Emitting Diode (LED). The light emitted by the emitter is reflected off an object and the light-receiver receives the light reflected off the object. According to the amount of the light received by the light-receiver, that is, the amount of the reflected light, the presence or movement of an object in a certain distance may be determined.

Recently, various electronic devices, such as portable electronic devices, smart phones, tablet Personal Computers (PCs), Moving Picture Experts Group (MPEG-1 or MPEG-2) Audio Layer 3 (MP3) players, Portable Multimedia Players (PMPs), and electronic-book terminals have equipped with gesture sensors to provide various functions using the gesture sensors.

However, the light-receiver of the optical gesture sensor may receive other types of light than the light reflected off the object. As a result, an error may occur in determination of the presence or movement of the object based on the amount of the light received by the light-receiver.

Therefore, a need exists for a method and an apparatus for preventing a malfunction of a gesture sensor.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for preventing a malfunction of a gesture sensor.

Another aspect of the present disclosure is to provide a method and an apparatus for setting a light amount threshold, which is set in a gesture sensor to detect presence of an object within an effective distance, variably according to a surrounding environment.

Another aspect of the present disclosure is to provide a method and an apparatus for setting a light amount threshold, which is set in a gesture sensor to detect presence of an object within an effective distance, dynamically or in real time.

Another aspect of the present disclosure is to provide a method and an apparatus for minimizing defective products in manufacturing of gesture sensors.

Other objects to be provided in the present disclosure may be understood by embodiments described below.

In accordance with an aspect of the present disclosure, a method for controlling a gesture sensor of an electronic device is provided. The method includes driving the gesture sensor to detect a light amount measurement with respect to light incident to the gesture sensor, comparing the light amount measurement with a light amount reference value, determining a weight value based on a result of the comparison, and determining a light amount threshold that is used based on object recognition of the gesture sensor by adding the weight value to the light amount measurement.

In accordance with another aspect of the present disclosure, an electronic device is provided. The electronic device includes a gesture sensor and a threshold determining module configured to receive a light amount measurement with respect to light incident to the gesture sensor, to compare the light amount measurement with a light amount reference value, and to determine a light amount threshold that is used based on object recognition of the gesture sensor by adding the weight value to the light amount measurement.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
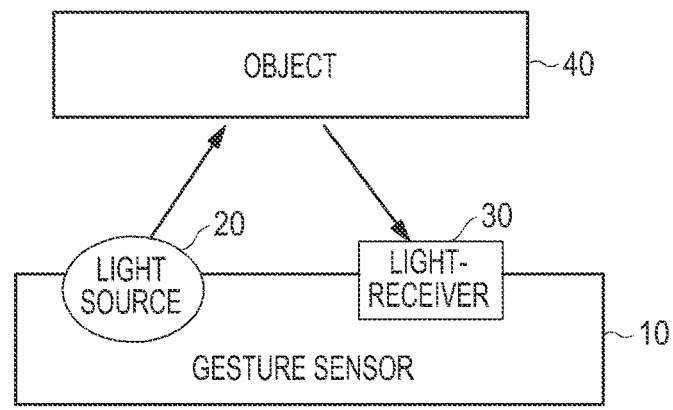
FIG. 1 is a diagram of a gesture sensor according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Terms "include" or "may include" used in various embodiments of the present disclosure indicate an existence of disclosed function, operation, or component, but do not limit an existence of one or more other functions, operations, or components. Terms "include" or "has" used in the present disclosure should be understood that they are intended to indicate an existence of feature, number, step, operation, component, item or any combination thereof, disclosed in the specification, but should not be understood that they are intended to previously exclude an existence of one or more other features, numbers, steps, operations, components, or any combination thereof or possibility of adding those things.

The term "or" in various embodiments of the present disclosure includes any or every combination of listed terms. For example, "A or B" may include either A or B, or both A and B.

Although ordinal numbers, such as "first", "second", and so forth will be used to describe various components, those components are not limited by the terms. For example, the terms do not limit the order and/or importance of the components. The terms are used for distinguishing one component from another component. For example, a first user device and a second user device are both user devices, and indicate different user devices. In addition, a first component may be referred to as a second component and likewise, a second component may also be referred to as a first component, without departing from the teaching of the present disclosure.

When it is said that a component is "connected" or "coupled" with another component, the component may be directly connected with another component, or still another component may exist between the components. On the other hand, when it is said that a component is "directly connected" or "directly coupled" with another component, no component exists between the components.

Terms used in various embodiments of the present disclosure are intended to describe an embodiment of the present disclosure, rather than to limit the various embodiments of the present disclosure. As used herein, the singular forms are intended to include the plural forms as well, unless the context clearly indicates otherwise.

Unless otherwise defined, all terms (including technical and scientific terms) used herein have the same meaning as commonly understood by one of ordinary skill in the art to which various embodiments belong. It will be further understood that terms, such as those defined in commonly used dictionaries, should be interpreted as having a meaning that is consistent with their meaning in the specification with the context of the relevant art as understood by the artisan at the time of disclosure and will not be interpreted in an idealized or overly formal sense unless expressly so defined herein.

An electronic device according to various embodiments of the present disclosure may be a device having a communication function. For example, the electronic device may include at least one of a smart phone, a tablet Personal Computer (PC), a mobile phone, a video phone, an electronic (e-)book reader, a desktop PC, a laptop PC, a netbook computer, a Personal Digital Assistant (PDA), a Portable Multimedia Player (PMP), a Moving Picture Experts Group (MPEG-1 or MPEG-2) Audio Layer 3 (MP3) player, a mobile medical equipment, a camera, a wearable device (for example, a Head-Mounted Device (HMD), such as electronic glasses), an electronic cloth, an electronic bracelet, an electronic necklace, an electronic appcessory, an electronic tattoo, a smart watch, and the like.

According to some embodiments of the present disclosure, the electronic device may be a smart home appliance having a communication function. The smart home appliance may include, for example, a Television (TV), a Digital Video Disk (DVD) player, an audio equipment, a refrigerator, an air conditioner, a vacuum cleaner, an oven, a microwave oven, a laundry machine, an air cleaner, a set-top box, a TV box (for example, HomeSync™ of Samsung, TV™ of Apple, TV™ of Google, and the like), a game console, an electronic dictionary, an electronic key, a camcorder, an electronic frame, and the like.

According to some embodiments of the present disclosure, the electronic device may include at least one of various medical equipment (for example, Magnetic Resonance Angiography (MRA), Magnetic Resonance Imaging (MRI), Computed Tomography (CT), an imaging device, an ultrasonic device, and the like), a navigation system, a Global Positioning System (GPS) receiver, an Event Data Recorder (EDR), a Flight Data Recorder (FDR), a vehicle infotainment device, an electronic equipment for ships (for example, a navigation system and a gyro compass for ships), avionics, a security device, a vehicle head unit, an industrial or home robot, an Automatic Teller's Machine (ATM), a Point of Sales (POS), and the like.

According to some embodiments of the present disclosure, the electronic device may include a part of a furniture or building/structure having a communication function, an electronic board, an electronic signature receiving device, a projector, and various measuring instruments (for example, a water, electricity, gas, or electric wave measuring device). The electronic device may be one of the above-listed devices or a combination thereof. It will be obvious to those of ordinary skill in the art that the electronic device is not limited to the above-listed devices.

Hereinafter, an electronic device will be described with reference to the accompanying drawings. The term "user" used in various embodiments of the present disclosure may refer to a person using the electronic device or a device using the electronic device, such as an artificial intelligence electronic device.

A gesture sensor (or a proximity sensor) is a sensor used to detect presence or absence, passage, continuous flow, and accumulation of an object and control a position of the object, by using a force of an electromagnetic field, without physical contact. Depending on the principles of detection, the gesture sensor may be classified into a magnetic gesture sensor, an optical gesture sensor, an ultrasonic gesture sensor, an inductive gesture sensor, a capacitive gesture sensor, an eddy-current gesture sensor, and the like.

FIG. 1 is a diagram of a gesture sensor according to an embodiment of the present disclosure.

Referring to FIG. 1, a gesture sensor 10 may include a light source 20 and a light-receiver 30.

The light source 20 may be a device for emitting light. The light source 20 may be, for example, a Light-Emitting Diode (LED) or an InfraRed (IR) LED.

The light-receiver 30 may be a device for detecting presence or absence of light. The light-receiver 30 may be, for example, a photo-diode.

The light emitted from the light source 20 may be reflected off an object 40, and the light reflected off the object 40 may be detected by the light-receiver 30. By using the amount of the reflected light incident to the light-receiver 30, presence or absence of the object 40 within a certain distance may be determined.

In other words, according to a result of comparing a measurement of the amount of the light detected by the light-receiver 30 with a light amount threshold of the gesture sensor 10, presence or absence of the object 40 within a certain distance from the gesture sensor 10 may be determined.

The light source 20 and the light-receiver 30 may be provided as one package or may be provided as independent entities.

The exterior of an electronic device equipped with the gesture sensor 10 will be described with reference to FIG. 2.

Figure 2:
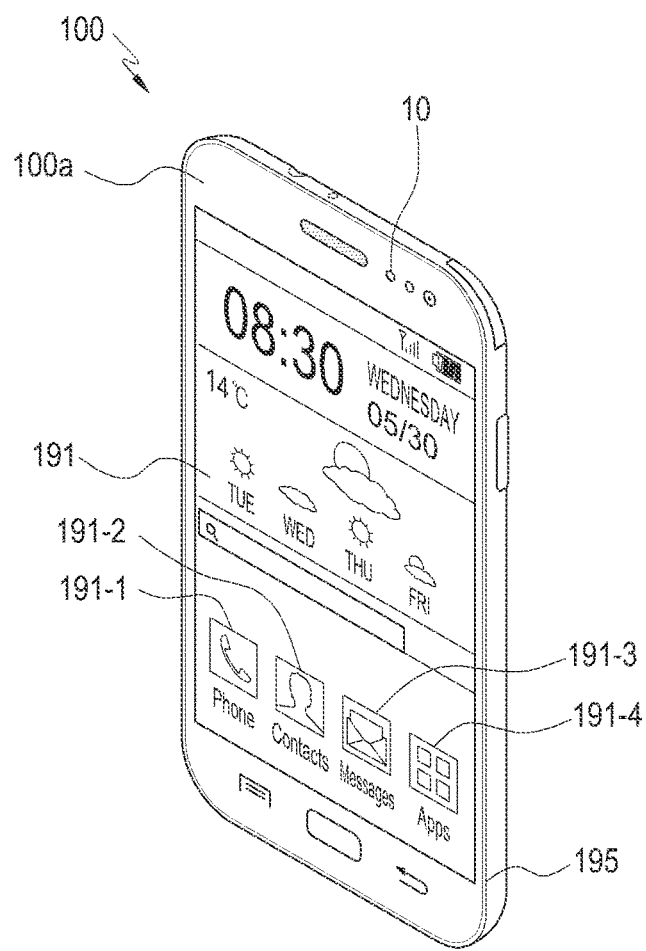
FIG. 2 is a perspective view of an exterior of an electronic device having a gesture sensor mounted thereon according to an embodiment of the present disclosure.

FIG. 2 is a perspective view of an exterior of an electronic device having a gesture sensor mounted thereon according to an embodiment of the present disclosure.

Referring to FIG. 2, a touch screen 191 is disposed in the center of a front surface 100a of an electronic device 100. The touch screen 191 may be formed to be large enough to occupy the most part of the front surface 100a of the electronic device 100. In FIG. 2, a main home screen is displayed on the touch screen 191. The main home screen is a screen that is first displayed on the touch screen 191 when the electronic device 100 is powered on. When the electronic device 100 has different home screens of several pages, the main home screen may be the first home screen among the home screens of several pages. On the home screen may be displayed short-cut icons 191-1, 191-2, and 191-3 for executing frequently used applications, a main menu switch key 191-4, time, weather, and the like. The main menu switch key 191-4 is used to display a menu screen on the touch screen 191.

The gesture sensor 10 may be disposed at an edge of the front surface 100a of the electronic device 100.

A transparent member 195 may be mounted on the front surface 100a of the electronic device 100. The transparent member 195 is a member for protecting various devices disposed on the front surface 100a of the electronic device 100, such as the touch screen 191 and the gesture sensor 10, and may be, for example, reinforced glass.

As in the embodiment illustrated in FIG. 2, the gesture sensor 10 may be positioned under the transparent member 195. Thus, once light is emitted from the light source 20 of the gesture sensor 10, diffused reflection may occur between the transparent member 195 and the gesture sensor 10 and also in the transparent member 195. The reflected light originating from the diffused reflection may be incident to the light-receiver 30 of the gesture sensor 10, causing the malfunction of the gesture sensor 10, as can be seen in an example illustrated in FIG. 3.

Figure 3:
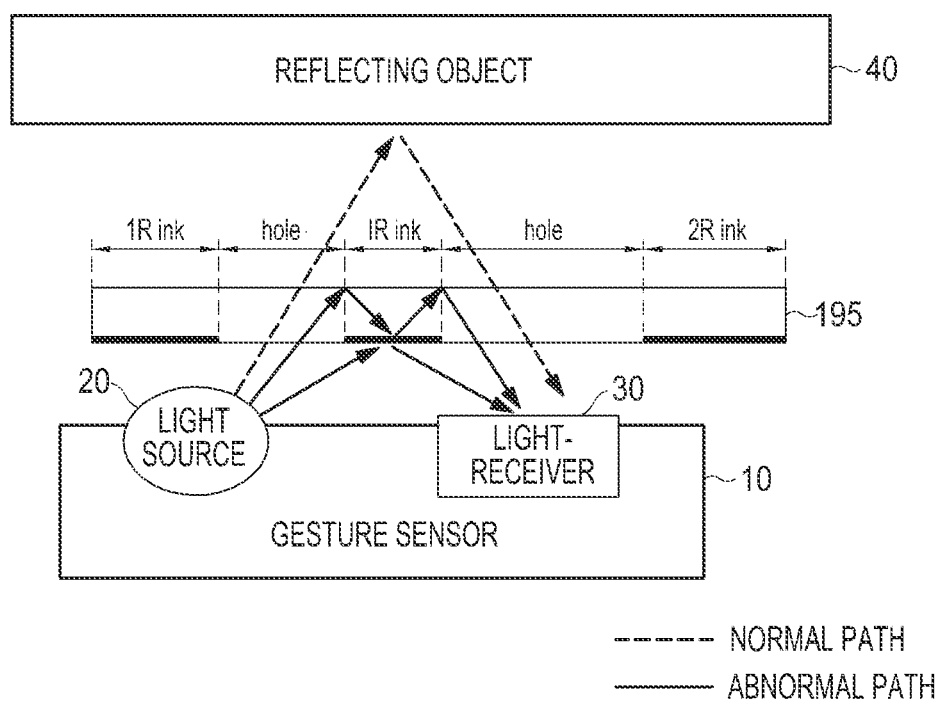
FIG. 3 is a diagram illustrating a detecting operation of a gesture sensor mounted on an electronic device according to an embodiment of the present disclosure.

FIG. 3 is a diagram illustrating a detecting operation of a gesture sensor mounted on an electronic device according to an embodiment of the present disclosure.

Referring to FIG. 3, IR ink may be applied to portions of the transparent member 195 other than portions of the transparent member 195 corresponding to the light source 20 and the light-receiver 30 of the gesture sensor 10, that is, hole portions.

In such a structure, light emitted from the light source 20 passes through a hole portion above the light source 20 and reaches the object 40. The light reflected off the object 40 passes through a hole portion above the light-receiver 30 and then is incident to the light-receiver 30. The light emitted from the light source 20 may be diffused-reflected in the transparent member 195 or may be diffused-reflected by a portion of the transparent member 195 to which the IR ink is applied. The diffused-reflected light may also be incident to the light-receiver 30.

Thus, even when the object 40 is not present near the gesture sensor 10, the light may be detected by the light-receiver 30. Such a phenomenon in which the light is incident to the light-receiver 30 in spite of absence of the object 40 may be referred to as "crosstalk".

As such, due to another reflected light (for example, the light diffused-reflected by the transparent member 195) except for the light reflected off the object 40, or due to crosstalk, in spite of absence of the object 40 within a certain distance from the gesture sensor 10, the object 40 may be determined to be present.

Various embodiments of the present disclosure set a light amount threshold of the gesture sensor 10 variably and dynamically according to a surrounding environment to prevent the malfunction of the gesture sensor 10.

Figure 4:
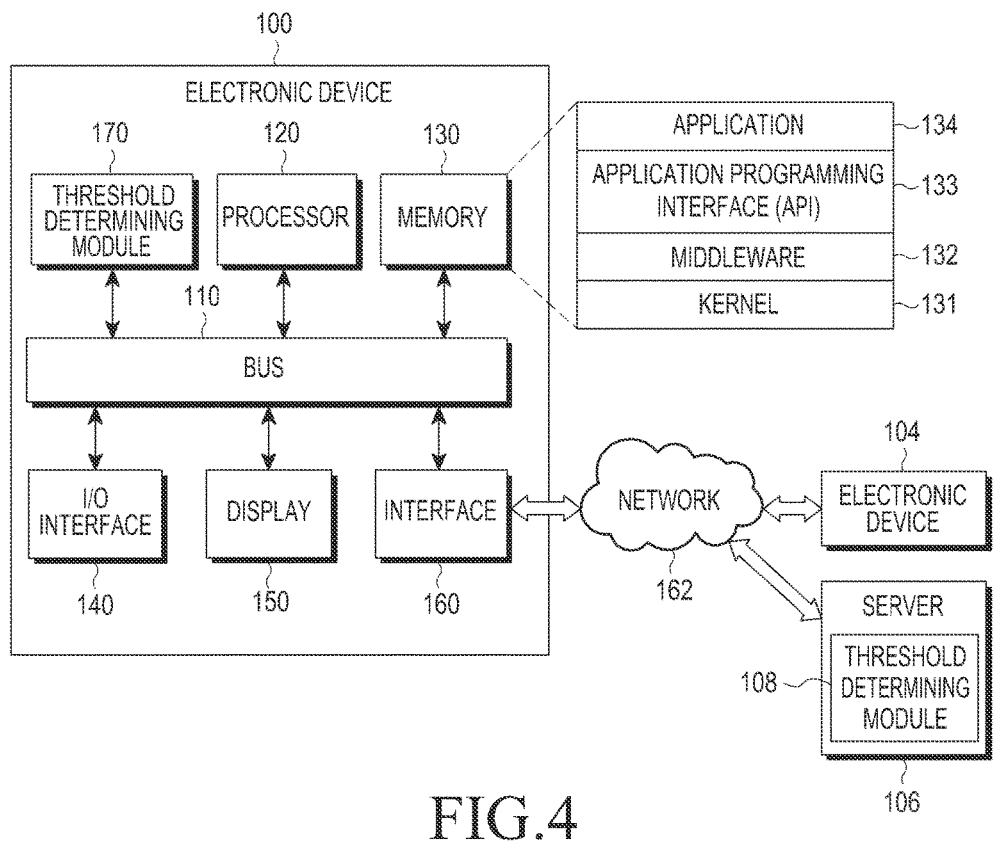
FIG. 4 is a diagram illustrating a network environment including an electronic device according to an embodiment of the present disclosure.

FIG. 4 is a diagram illustrating a network environment including an electronic device according to an embodiment of the present disclosure.

Referring to FIG. 4, the electronic device 100 may include a bus 110, a processor 120, a memory 130, an input/output interface 140, a display 150, a communication interface 160, and a threshold determining module 170.

The bus 110 may be a circuit for connecting the foregoing components with each other and delivering communication (for example, a control message) between the components.

The processor 120 receives a command from the above-described other components (for example, the memory 130, the input/output interface 140, the display 150, the communication module 160, and the threshold determining module 170) through the bus 110, decrypts the received command, and executes an operation or data processing corresponding to the decrypted command.

The memory 130 stores a command or data received from or generated by the processor 120 or other components (for example, the input/output interface 140, the display 150, the communication module 160, and the threshold determining module 170). The memory 130 may include programming modules, for example, a kernel 131, a middleware 132, an Application Programming Interface (API) 133, or an application 134. These programming modules may include software, firmware, hardware, or a combination of at least two of them.

The kernel 131 controls or manages system resources (for example, the bus 110, the processor 120, and the memory 130) used to execute an operation or a function implemented in the other programming modules, for example, the middleware 132, the API 133, and the application 134. The kernel 131 provides an interface through which the middleware 132, the API 133, or the application 134 accesses a separate component of the electronic device 100 to control the separate component.

The middleware 132 performs a relay operation such that the API 133 or the application 134 exchanges data in communication with the kernel 131. The middleware 132 controls task requests (for example, scheduling or load balancing), by using a method of assigning a priority for using a system resource (for example, the bus 110, the processor 120, or the memory 130) of the electronic device 100 to, for example, at least one of the applications 134.

The API 133 is an interface through which the application 134 controls a function provided by the kernel 133 or the middleware 132, and may include at least one interface or function (for example, a command) for, for example, file control, window control, image processing or character control.

According to various embodiments of the present disclosure, the applications 134 may include at least one of a Short Message Service (SMS)/Multimedia Messaging Service (MMS) application, an e-mail application, a calendar application, an alarm application, a health care application (for example, an application for measuring at least one of the amount of exercise and blood sugar), and an environment information application (for example, an application for providing at least one of an atmospheric pressure, humidity, and temperature information). Additionally or alternatively, the application 134 may be an application related to information exchange between the electronic device 101 and an external electronic device (for example, the electronic device 104). The application related to the information exchange may include, for example, a notification relay application for relaying particular information to the external electronic device or a device management application for managing the external electronic device.

For example, the notification relay application may include a function of relaying notification information generated in another application of the electronic device 101 (for example, the SMS/MMS application, the e-mail application, the health care application, the environment information application, and the like) to the external electronic device (for example, the electronic device 104). Additionally or alternatively, the notification relay application may, for example, receive notification information from the external electronic device (for example, the electronic device 104) and provide the notification information to the user. The device management application may manage (for example, at least one of install, uninstall, and update) a function (for example, at least one of turn-on/turn-off of the external electronic device (or an element thereof) and adjustment of a brightness (or resolution) of a display) of at least a portion of the external electronic device (for example, the electronic device 104) communicating with the electronic device 101, an application running on the external electronic device, or a service provided in the external electronic device (for example, a call service or a message service).

According to various embodiments of the present disclosure, the applications 134 may include an application designated according to attributes (for example, a type of the electronic device) of the external electronic device (for example, the electronic device 104). For example, if the external electronic device is an MP3 player, the applications 134 may include an application related to music playback. If the external electronic device is mobile medical equipment, the applications 134 may include an application related to health care. According to an embodiment of the present disclosure, the application 134 may include at least one of an application designated in the electronic device 101 and an application received from an external electronic device (for example, the server 106 or the electronic device 104).

The memory 130 stores a light amount reference value, a default threshold, and a weight value.

The light amount reference value may be a reference value that is referred to for determination of a light amount threshold of the gesture sensor 10 according to a light amount measurement based on crosstalk of the gesture sensor 10 when the electronic device 100 is turned on. For example, the light amount threshold of the gesture sensor 10 may be determined according to a result of comparing the light amount measurement based on the crosstalk of the gesture sensor 10 in power-on of the electronic device 100 with the light amount reference value.

According to an embodiment of the present disclosure, the light amount reference value may be used as a defect determination criterion for the gesture sensor 10 during manufacturing of the gesture sensor 10. For example, during manufacturing of the gesture sensor 10, if the light amount measurement of the gesture sensor 10 based on crosstalk of the gesture sensor 10 is greater than a light amount reference value, the gesture sensor 10 may be determined to have an assembly failure and a sensor failure and may be processed as a defective product.

The light amount threshold is the amount of light, which is used for the gesture sensor 10 to determine an effective distance within which presence or absence of the object 40 is detect or to determine presence or absence of the object 40 within the effective distance. The light amount threshold may include a recognition threshold and a release threshold. If the light amount measurement of light detected by the light-receiver 30 of the gesture sensor 10 is greater than the recognition threshold, the object 40 may be determined to be present within the effective distance. If the light amount measurement of the light detected by the light-receiver 30 of the gesture sensor 10 is less than the release threshold, the object 40 may be determined to be absent within the effective distance.

The default threshold may be a threshold set as the light amount threshold of the gesture sensor 10 if the light amount measurement of the gesture sensor 10 is greater than the light amount reference value in power-on of the electronic device 100. The default threshold may include a default recognition threshold and a default release threshold.

The weight value is a value used to determine the light amount threshold of the gesture sensor 10, if the light amount measurement of the gesture sensor 10 is less than the light amount threshold in power-on of the electronic device 100, or if the light amount measurement of the gesture sensor 10 is less than the light amount threshold upon occurrence of a threshold resetting event in the electronic device 100. The weight value may include a recognition weight value and a release weight value. The recognition weight value and the release weight value may be values for securing a minimum effective distance of the gesture sensor 10 when the light amount measurement is 0, that is, when crosstalk does not occur.

The input/output interface 140 delivers a command or data input from a user through an input/output device (for example, a sensor, a keyboard, a touch screen, and the like) to the processor 120, the memory 130, the communication interface 160, or the threshold determining module 170 through, for example, the bus 110. For example, the input/output interface 140 may provide data corresponding to a user's touch input through the touch screen to the processor 120. The input/output interface 140 may output a command or data, which is received from the processor 120, the memory 130, the communication interface 160, or the threshold determining module 170 through the bus 110, through an input/output device (for example, a speaker or a display). For example, the input/output interface 140 may output audio data processed through the processor 120 to the user through the speaker.

The display 150 displays various information (for example, multimedia data or text data) and images to the user.

The communication interface 160 connects communication between the electronic device 100 and an external device (for example, the electronic device 104 or the server 106). For example, the communication interface 160 may be connected to the network 162 through wireless communication or wired communication to communicate with the external device. Wireless communication may include at least one selected from among Wireless Fidelity (WiFi), Bluetooth (BT), Near Field Communication (NFC), a GPS, and cellular communication (for example, Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), Global System for Mobile Communications (GSM), and the like). The wired communication may include, for example, at least one of Universal Serial Bus (USB), a High Definition Multimedia Interface (HDMI), a Recommended Standard (RS)-232, and a Plain Old Telephone Service (POTS).

According to an embodiment of the present disclosure, the network 162 may be a telecommunications network that may include at least one selected from among a computer network, the Internet, Internet of things, and a telephone network. According to an embodiment of the present disclosure, a protocol (for example, a transport layer protocol, a data link layer protocol, a physical layer protocol, and the like) for communication between the electronic device 101 and the external electronic device may be supported in at least one selected from among the applications 134, the API 133, the middleware 132, the kernel 131, and the communication interface 160.

According to an embodiment of the present disclosure, the server 106 may support driving of the electronic device 100 by performing at least one selected from among operations (or functions) implemented in the electronic device 100. For example, the server 106 may include a threshold determining server module 108 capable of supporting the threshold determining module 170 implemented in the electronic device 100. The threshold setting server module 108 may include at least one selected from among components of the threshold setting module 170 to perform (for example, perform in place of the threshold setting module 170) at least one selected from among operations performed by the threshold setting module 170.

Figure 5:
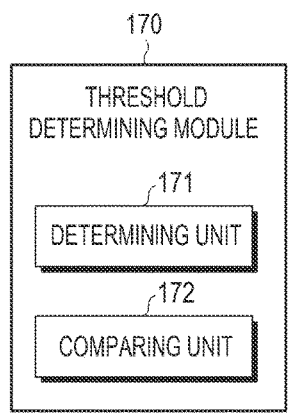
FIG. 5 is a block diagram of a threshold determining module according to an embodiment of the present disclosure.
Figure 6:
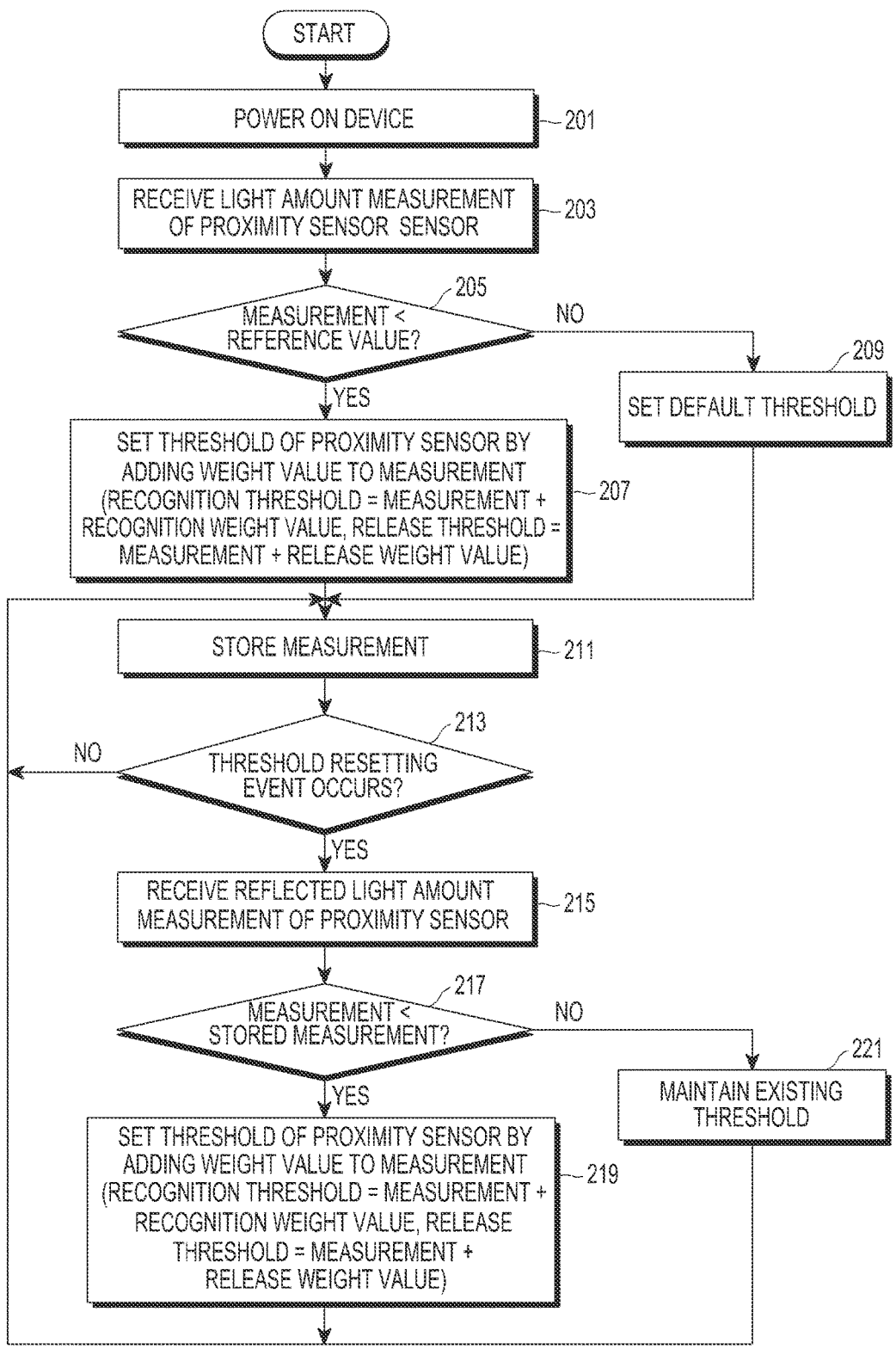
FIGS. 6 and 7 are flowcharts illustrating operations of an electronic device according to embodiments of the present disclosure.
Figure 7:
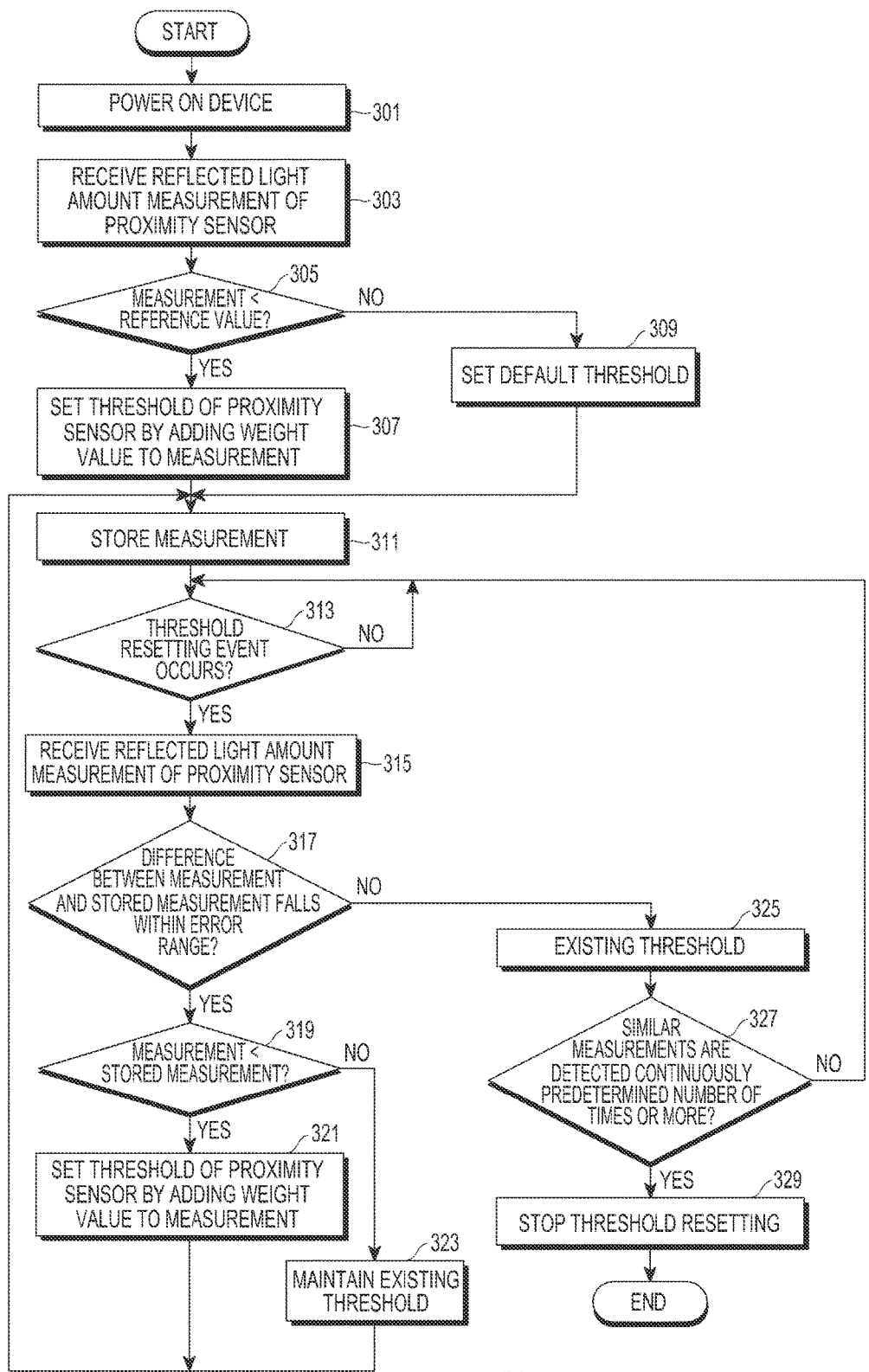

The threshold determining module (or control module) 170 processes at least a portion of information obtained from other components (for example, the processor 120, the memory 130, the input/output interface 140, the communication interface 160, and the like), and provides the processed information portion to the user in various manners. The threshold determining module 170 determines the light amount threshold of the gesture sensor 10, by using or independently of the processor 120. For example, the threshold determining module 170 may determine the light amount threshold of the gesture sensor 10 according to a result of comparing a light amount measurement based on crosstalk of the gesture sensor 10 in power-on of the electronic device 100 with the light amount reference value. The threshold determining module 170 may also determine the light amount threshold of the gesture sensor 10 when the threshold resetting event occurs in the electronic device 100. According to an embodiment of the present disclosure, at least one selected from among the components of the threshold determining module 170 may be included in the server 106 (for example, the threshold determining server module 108), and at least one selected from among the operations implemented in the threshold determining module 170 may be supported by the server 106. With reference to FIGS. 5 through 7, the threshold determining module 170 will be further described.

FIG. 5 is a block diagram of a threshold determining module of an electronic device according to an embodiment of the present disclosure.

Referring to FIG. 5, the threshold determining module 170 may include a determining unit 171 and a comparing unit 172.

Under control of the determining unit 171, the comparing unit 172 receives a measurement of the amount of light incident to the light-receiver 30 from the gesture sensor 10 and compares the received light amount measurement with a light amount reference value or a previously stored light amount measurement. The comparing unit 172 outputs the comparing result to the determining unit 171.

Upon detecting occurrence of the threshold resetting event, the determining unit 171 controls current to be applied to the gesture sensor 10, thus driving the gesture sensor 10. The determining unit 171 determines the light amount threshold of the gesture sensor 10, by using the light amount measurement, the comparing result received from the comparing unit 172, the default threshold, and the weight value.

The threshold resetting event may occur when resetting of the light amount threshold of the gesture sensor 10 is needed. For example, the threshold resetting event may occur when the electronic device 100 is powered on. The threshold resetting event may also occur when an application using the gesture sensor 10 is executed. For example, the threshold resetting event may occur when a call application is executed. The threshold resetting event may also occur according to sending or reception of a call. In another example, the threshold resetting event may occur when a user's touch input is detected on the touch screen of the electronic device 100.

According to an embodiment of the present disclosure, the determining unit 171 may control the gesture sensor 10 to be driven when the electronic device is powered on. Thus, the light source 20 of the gesture sensor 10 emits light and the light-receiver 30 detects the incident light. The light-receiver 30 may measure the amount of light and output a light amount measurement to the comparing unit 172. The comparing unit 172 compares the light amount measurement received from the gesture sensor 10 with a light amount reference value and outputs the comparing result to the determining unit 171. If the comparing result received from the comparing unit 172 indicates that the light amount reference value is less than the light amount measurement, the determining unit 171 adds a weight value to the light amount measurement to determine an addition result as the light amount threshold of the gesture sensor 10. If the received comparing result indicates that the light amount reference value is greater than the light amount measurement, the determining unit 171 determines the default threshold as the light amount threshold of the gesture sensor 10. The determining unit 171 stores the light amount measurement in the memory 130.

Thereafter, upon occurrence of the threshold resetting event, the determining unit 171 controls the gesture sensor 10 to be driven to output the light amount measurement measured by the light-receiver 30, that is, the current light amount measurement to the comparing unit 172. The comparing unit 172 compares the light amount measurement measured by the light-receiver 30, that is, the current light amount measurement with a light amount measurement stored in the memory 130, under control of the determining unit 171. The comparing unit 172 outputs the comparing result to the determining unit 171. If the current light amount measurement is less than the stored light amount measurement as a result of the comparison, the determining unit 171 adds the weight value to the current light amount measurement to determine the addition result as the light amount threshold of the gesture sensor. If the current light amount measurement is less than the stored light amount measurement as a result of the comparison, the determining unit 171 maintains the existing light amount threshold.

In another embodiment of the present disclosure, the determining unit 171 maintains the existing light amount threshold if a difference between the current light amount measurement and the stored light amount measurement is within an error range. The difference between the current light amount measurement and the stored light amount measurement may be calculated by the comparing unit 172. If similar light amount measurements are detected in successive at least a certain number of times, then light amount threshold resetting may be stopped. In other words, despite occurrence of the threshold resetting event, the light amount threshold of the gesture sensor 10 may be reset any more.

According to an embodiment of the present disclosure, an electronic device includes a gesture sensor and a threshold determining module configured to receive a light amount measurement with respect to light incident to the gesture sensor, to compare the light amount measurement with a light amount reference value, and to determine a light amount threshold that is used based on object recognition of the gesture sensor by adding the weight value to the light amount measurement.

According to an embodiment of the present disclosure, the threshold determining module may be configured to determine the light amount threshold by adding the weight value to the light amount measurement, if the light amount measurement is less than the light amount reference value.

According to an embodiment of the present disclosure, the threshold determining module may be configured to determine a default light amount threshold as a light amount threshold of the gesture sensor, if the light amount measurement is greater than the light amount reference value.

According to an embodiment of the present disclosure, to determine the light amount threshold of the gesture sensor, the threshold determining module may be configured to determine a recognition threshold by adding a recognition weight value to the light amount measurement and to determine a release threshold by adding a release weight value to the light amount measurement.

According to an embodiment of the present disclosure, the recognition weight value and the release weight value may be different values.

According to an embodiment of the present disclosure, the threshold determining module may be configured to store the light amount measurement, to drive the gesture sensor to receive the light amount measurement with respect to the light incident to the gesture sensor upon occurrence of a threshold resetting event, to compare the detected light amount measurement with the stored light amount measurement, to determine the light amount threshold of the gesture sensor by adding a weight value to the detected light amount measurement if the detected light amount measurement is less than the stored light amount measurement, and to maintain an existing light amount threshold if the detected light amount measurement is greater than the stored light amount measurement.

According to an embodiment of the present disclosure, the threshold determining module may be configured to store the light amount measurement, to drive the gesture sensor to receive the light amount measurement with respect to the light incident to the gesture sensor upon occurrence of the threshold resetting event, to reset the light amount threshold of the gesture sensor if a difference between the detected light amount measurement and the stored light amount measurement falls beyond an error range, to maintain an existing light amount threshold if the difference between the detected light amount measurement and the stored light amount measurement falls within the error range, and to stop resetting the light amount threshold if a light amount measurement satisfying the error range is detected continuously at least a certain number of times.

According to an embodiment of the present disclosure, the gesture sensor may include a light source configured to emit light and a light-receiver configured to determine a light amount measurement by measuring the amount of incident light.

A process in which the electronic device 100 structured as described above operates according to an embodiment will be described below with reference to FIGS. 6 and 7.

FIGS. 6 and 7 are flowcharts illustrating operations of an electronic device according to embodiments of the present disclosure.

Referring to FIG. 6, if the electronic device 100 is powered on in operation 201, the threshold determining module 170 of the electronic device 100 receives a light amount measurement detected by the gesture sensor 10 in operation 203.

The threshold determining module 170 compares the light amount measurement received in operation 203 with a light amount reference value in operation 205, and performs operation 207 if the light amount measurement is less than the light amount reference value as a result of the comparison.

In operation 207, the threshold determining module 170 determines and sets a light amount threshold of the gesture sensor 10 by adding a weight value to the light amount measurement. In other words, the threshold determining module 170 determines a recognition threshold by adding a recognition weight value to the light amount measurement, and determines a release threshold by adding a release weight value to the light amount measurement. The recognition weight value and the release weight value may be different values.

If the light amount measurement is greater than the light amount reference value as a result of the comparison of operation 205, the threshold determining module 170 determines and sets the light amount threshold of the gesture sensor 10 as a default light amount threshold in operation 209.

In operation 211, the threshold determining module 170 stores the light amount measurement measured in operation 203 in the memory 130.

If detecting occurrence of a threshold resetting event in operation 213, the threshold determining module 170 performs operation 215 in which the threshold determining module 170 receives the light amount measurement detected by the gesture sensor 10.

In operation 217, the threshold determining module 170 compares the light amount measurement measured in operation 215, that is, a current light amount measurement, with the light amount measurement stored in operation 211, and if the current light amount measurement is less than the stored light amount measurement, the threshold determining module 170 performs operation 219.

In operation 219, the threshold determining module 170 determines and sets the light amount threshold of the gesture sensor 10 by adding the weight value to the current light amount measurement. In other words, the threshold determining module 170 determines a recognition threshold by adding a recognition weight value to the light amount measurement, and determines a release threshold by adding a release weight value to the light amount measurement.

If the current light amount measurement is greater than the stored light amount measurement as a result of the comparison of operation 217, the threshold determining module 170 maintains the existing light amount threshold in operation 221.

The threshold determining module 170 proceeds to operation 211 to delete the previously stored light amount measurement and to store the light amount measurement measured in operation 215 in the memory 130.

According to another embodiment of the present disclosure, the threshold determining module 170 maintains the existing light amount threshold if the difference between the current light amount measurement and the stored light amount measurement is within an error range. If similar light amount measurements are detected continuously at least a certain number of times, light amount threshold resetting may be stopped, as will be described below with reference to FIG. 7.

Referring to FIG. 7, once the electronic device 100 is powered on in operation 301, the threshold determining module 170 of the electronic device 100 receives a light amount measurement detected by the gesture sensor 10 in operation 303.

In operation 305, the threshold determining module 170 compares the light amount measurement measured in operation 303 with a light amount reference value, and if the light amount measurement is less than the light amount reference value as a result of the comparison, the threshold determining module 170 performs operation 307.

In operation 307, the threshold determining module 170 determines and sets the light amount threshold of the gesture sensor 10 by adding a weight value to the light amount measurement. The threshold determining module 170 determines a recognition threshold by adding a recognition weight value to the light amount measurement and determines a release threshold by adding a release weight to the light amount measurement. If the light amount measurement is greater than a light amount reference value as a result of the comparison of operation 305, the threshold determining module 170 performs operation 309 in which the threshold determining module 170 determines and sets the light amount threshold of the gesture sensor 10 as a default light amount threshold.

In operation 311, the threshold determining module 170 stores the light amount measurement received in operation 303 in the memory 130.

Upon detecting occurrence of a threshold resetting event in operation 313, the threshold determining module 170 performs operation 315 in which the threshold determining module 170 receives the light amount measurement received by the gesture sensor 10.

In operation 317, the threshold determining module 170 determines whether a difference between the light amount measurement measured in operation 315, that is, a current light amount measurement, and the light amount measurement stored in operation 311 is within an error range. If the difference falls within the error range, the threshold determining module 170 proceeds to operation 325, and if the difference falls beyond the error range, the threshold determining module 170 proceeds to operation 319.

In operation 319, the threshold determining module 170 compares the light amount measurement measured in operation 315, that is, the current light amount measurement, with the light amount measurement stored in operation 311, and if the current light amount measurement is less than the stored light amount measurement as a result of the comparison, the threshold determining module 170 performs operation 321.

In operation 321, the threshold determining module 170 determines and sets the light amount threshold of the gesture sensor 10 by adding the weight value to the current light amount measurement. In other words, the threshold determining module 170 determines a recognition threshold by adding a recognition weight value to the light amount measurement and determines a release threshold by adding a release weight value to the light amount measurement.

If the current light amount measurement is greater than the stored light amount measurement as a result of the comparison of operation 319, the threshold determining module 170 maintains the existing light amount threshold in operation 323.

The threshold determining module 170 performs operation 311 to delete the previously stored light amount measurement and to store the light amount measurement received in operation 315 in the memory 130.

If the difference between the current light amount measurement and the light amount measurement stored in operation 311 falls beyond the error range in operation 317, the threshold determining module 170 maintains the existing light amount threshold in operation 325.

The threshold determining module 170 determines whether similar light amount measurements, in other words, light amount measurements falling within the error range are detected continuously at least a certain number of times, in operation 327. If the similar light amount measurements are not detected continuously a certain number of times, the threshold determining module 170 proceeds to operation 313.

If the similar light amount measurements are detected continuously a certain number of times, the threshold determining module 170 proceeds to operation 329 to stop threshold resetting. In the current embodiment of the present disclosure, the malfunction of the gesture sensor 10 may be prevented. In addition, to detect presence of an object within an effective distance, the light amount threshold that is set in the gesture sensor 10 may be set variably according to a surrounding environment. The light amount threshold that is set in the gesture sensor 10 may be set dynamically or in real time. Moreover, in manufacturing of the gesture sensor 10, a manufacturing defect may be minimized.

According to an embodiment of the present disclosure, a method for controlling a gesture sensor of an electronic device may include driving the gesture sensor to detect a light amount measurement with respect to light incident to the gesture sensor, comparing the light amount measurement with a light amount reference value, determining a weight value based on a result of the comparison, and determining a light amount threshold that is used based on object recognition of the gesture sensor by adding the weight value to the light amount measurement.

According to an embodiment of the present disclosure, the method may further include determining the light amount threshold by adding the weight value to the light amount measurement, if the light amount measurement is less than the light amount reference value.

According to an embodiment of the present disclosure, the method may further include determining a default light amount threshold as a light amount threshold of the gesture sensor, if the light amount measurement is greater than the light amount reference value.

According to an embodiment of the present disclosure, the determining of the light amount threshold of the gesture sensor may include determining a recognition threshold by adding a recognition weight value to the light amount measurement and determining a release threshold by adding a release weight value to the light amount measurement.

According to an embodiment of the present disclosure, the recognition weight value and the release weight value may be different values.

According to an embodiment of the present disclosure, the method may further include storing the light amount measurement, driving the gesture sensor to receive the light amount measurement with respect to the light incident to the gesture sensor upon occurrence of a threshold resetting event, comparing the detected light amount measurement with the stored light amount measurement, determining the light amount threshold of the gesture sensor by adding a weight value to the detected light amount measurement, if the detected light amount measurement is less than the stored light amount measurement, and maintaining an existing light amount threshold if the detected light amount measurement is greater than the stored light amount measurement.

According to an embodiment of the present disclosure, the method may further include storing the light amount measurement, driving the gesture sensor to receive the light amount measurement with respect to the light incident to the gesture sensor upon occurrence of the threshold resetting event, resetting the light amount threshold of the gesture sensor if a difference between the detected light amount measurement and the stored light amount measurement falls beyond an error range, maintaining an existing light amount threshold if the difference between the detected light amount measurement and the stored light amount measurement falls within the error range, and stopping resetting the light amount threshold, if a light amount measurement satisfying the error range is detected continuously at least a certain number of times.

According to an embodiment of the present disclosure, the receiving of the light amount measurement may include emitting light from a light source included in the gesture sensor and receiving a light amount measurement with respect to light incident to a light-receiver included in the gesture sensor.

Figure 8:
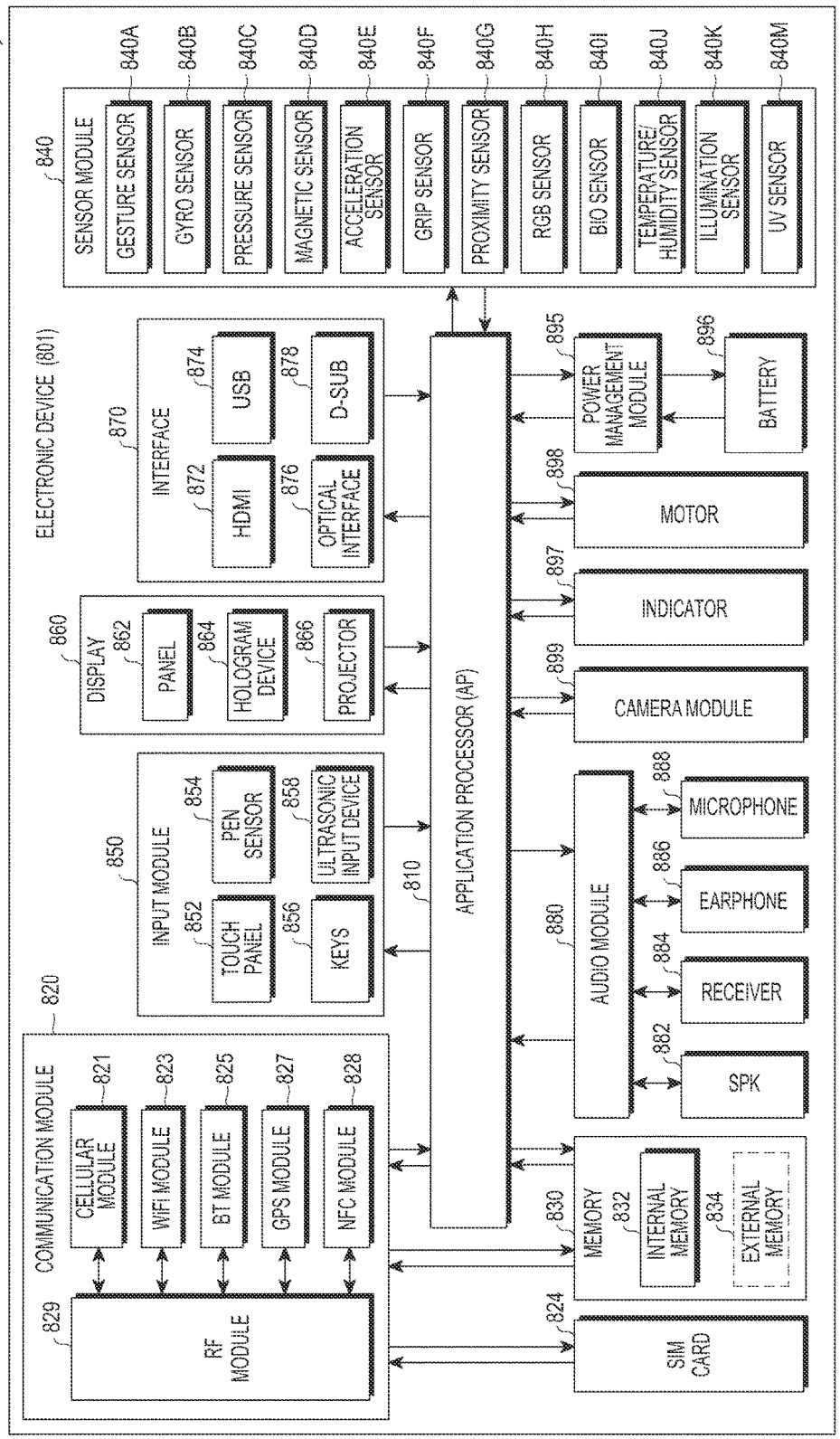
FIG. 8 is a block diagram of an electronic device according to an embodiment of the present disclosure.

FIG. 8 is a block diagram of an electronic device according to an embodiment of the present disclosure. An electronic device 800 of FIG. 8 may constitute the entire electronic device 100 illustrated in FIG. 4 or a portion thereof.

Referring to FIG. 8, the electronic device 800 may include one or more APs 810, a communication module 820, an SIM card 824, a memory 830, a sensor module 840, an input device 850, a display 860, an interface 870, an audio module 880, a camera module 899, a power management module 895, a battery 896, an indicator 897, a motor 898, and a threshold determining module 170.

The AP 810 drives an Operating System (OS) or an application program to control multiple hardware or software components connected to the AP 810 and to perform processing and operations of various data including multimedia data. The AP 810 may be implemented with, for example, a System on Chip (SoC). According to an embodiment of the present disclosure, the AP 810 may further include a Graphical Processing Unit (GPU, not illustrated).

The communication module 820 (for example, the communication interface 160) may perform data transmission/reception in communication between the electronic device 800 (for example, the electronic device 100) and other electronic devices (for example, the electronic device 104 or the server 106) connected through the network. According to an embodiment of the present disclosure, the communication module 820 may include at least one of a cellular module 821, a WiFi module 823, a BT module 825, a GPS module 827, an NFC module 828, and a Radio Frequency (RF) module 829.

The cellular module 821 provides at least one of voice communication, video communication, a messaging service, and an Internet service through a communication network (for example, LTE, LTE-A, CDMA, WCDMA, UMTS, WiBro, GSM, or the like). The cellular module 821 may identify and authenticate an electronic device in a communication network by using a subscriber identification module (for example, the SIM card 824). According to an embodiment of the present disclosure, the cellular module 821 performs at least some of functions provided by the AP 810. For example, the cellular module 821 may perform at least a part of a multimedia control function.

According to an embodiment of the present disclosure, the cellular module 821 may include a Communication Processor (CP). The cellular module 821 may be implemented with, for example, an SoC. Although components, such as the cellular module 821 (for example, the communication processor), the memory 830, or the power management module 895 are illustrated as being separated from the AP 810, the AP 810 may be implemented to include at least some (for example, the cellular module 821) of the foregoing components.

According to an embodiment of the present disclosure, the AP 810 or the cellular module 821 (for example, the CP) may load a command or data received from at least one of a nonvolatile memory connected thereto and other components to a volatile memory and process the received command or data. The AP 810 or the cellular module 821 may store data received from at least one of other components or data generated by at least one of other components in the nonvolatile memory.

Each of the WiFi module 823, the BT module 825, the GPS module 827, and the NFC module 828 may include a processor for processing data transmitted and received through the corresponding module. Although the cellular module 821, the WiFi module 823, the BT module 825, the GPS module 827, and the NFC module 828 are illustrated as separate blocks in FIG. 8, at least some (for example, two or more) of the cellular module 821, the WiFi module 823, the BT module 825, the GPS module 827, and the NFC module 828 may be included in one Integrated Chip (IC) or IC package. For example, at least some of processors corresponding to the cellular module 821, the WiFi module 823, the BT module 825, the GPS module 827, and the NFC module 828 (for example, the CP 811 corresponding to the cellular module 821 and a WiFi processor corresponding to the WiFi module 823) may be implemented in one SoC.

The RF module 829 may transmit and receive data, for example, a RF signal. The RF module 829 may include, although not shown, at least one of a transceiver, a Power Amplification Module (PAM), a frequency filter, and a Low Noise Amplifier (LNA). The RF module 829 may further include at least one of parts for transmitting and receiving electromagnetic waves on a free space, for example, a conductor and a conductive wire, in wireless communication. Although the cellular module 821, the WiFi module 823, the BT module 825, the GPS module 827, and the NFC module 828 are illustrated as sharing one RF module 829 in FIG. 8, at least one of the cellular module 821, the WiFi module 823, the BT module 825, the GPS module 827, and the NFC module 828 may transmit and receive an RF signal through a separate RF module according to an embodiment.

The SIM card 824 may be a card including a subscriber identification module, and may be inserted into a slot formed in a particular position of the electronic device. The SIM card 824 may include unique identification information (for example, an ICCID) or subscriber information (for example, an IMSI).

The memory 830 (for example, the memory 130) may include an internal memory 832 or an external memory 834. The internal memory 832 may include at least one selected from among a volatile memory (for example, a Dynamic Random Access Memory (DRAM), a Static RAM (SRAM), a Synchronous Dynamic RAM (SDRAM), or the like) and a nonvolatile memory (for example, One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, or the like).

According to an embodiment of the present disclosure, the internal memory 832 may be a Solid State Drive (SSD). The external memory 834 may further include a flash drive, for example, at least one of a compact flash, Secure Digital (SD), micro-SD, mini-SD, extreme Digital (xD), and a memory stick. The external memory 834 may be functionally connected with the electronic device 800 through various interfaces. According to an embodiment of the present disclosure, the electronic device 800 may further include a storage device (or storage medium), such as a hard drive.

The sensor module 840 measures a physical quantity or detects an operation state of the electronic device 800 to convert the measured or detected information into an electric signal. The sensor module 840 may include at least one selected from among a gesture sensor 840A, a gyro sensor 840B, a pressure sensor 840C, a magnetic sensor 840D, an acceleration sensor 840E, a grip sensor 840F, a proximity sensor 840G, a color sensor 840H (for example, Red, Green, Blue (RGB) sensor), a bio sensor 840I, a temperature/humidity sensor 840J, an illumination sensor 840K, an Ultra Violet (UV) sensor 840M, and the like. Additionally or alternatively, the sensor module 840 may include at least one selected from among an E-nose sensor (not illustrated), an Electromyography (EMG) sensor (not illustrated), an Electroencephalogram (EEG) sensor (not illustrated), an Electrocardiogram (EGC) sensor (not illustrated), an IR sensor (not illustrated), an iris sensor (not illustrated), a fingerprint sensor (not illustrated), and the like. The sensor module 840 may further include a control circuit for controlling at least one sensors included therein.

The input device 850 may include a touch panel 852, a (digital) pen sensor 854, a key 856, or an ultrasonic input device 858. The touch panel 852 may recognize a touch input by using at least one of a capacitive, a resistive, infrared, or ultrasonic scheme. The touch panel 852 may further include a control circuit. For the capacitive touch panel 852, recognition of a physical contact or approach is possible. The touch panel 852 may further include a tactile layer. In this case, the touch panel 852 may provide tactile reaction to a user.

The (digital) pen sensor 854 may be implemented using a method that is the same as or similar to a user's touch input or by using a separate recognition sheet. The key 856 may include a physical button, an optical key, a keypad, and the like. The ultrasonic input device 858 is a device that allows the electronic device 800 to detect ultrasonic waves, an input using an input unit that generates an ultrasonic signal, through a microphone (for example, a microphone 888), and to determine data. The ultrasonic input device 858 is capable of performing wireless recognition. According to an embodiment of the present disclosure, the electronic device 800 may receive a user input from an external electronic device (for example, a computer or a server) connected thereto by using the communication module 820.

The display 860 (for example, the display 150) may include a panel 862, a hologram device 864, or a projector 866. The panel 862 may be, for example, a Liquid Crystal Display (LCD), an Active-Matrix Organic Light-Emitting Diode (OLED), or the like. The panel 862 may be implemented as being flexible, transparent, or wearable. The panel 862 may be implemented with the touch panel 852 as one module. The hologram device 864 may show a stereoscopic image in the air by using interference of light. The projector 866 may project light onto the screen to display an image. The screen may be positioned inside or outside the electronic device 800. According to an embodiment of the present disclosure, the display 860 may further include a control circuit for controlling the panel 862, the hologram device 864, or the projector 866.

The interface 870 may include a HDMI 872, a USB 874, an optical interface 876, or a D-subminiature 878. The interface 870 may be included in the communication interface 160 illustrated in FIG. 4. Additionally or alternatively, the interface 870 may include a Mobile High-definition Link (MHL) interface, an SD card/Multimedia Card (MMC) interface, or an Infrared Data Association (IrDA) standard interface.

The audio module 880 bi-directionally converts sound and an electric signal. At least some components of the audio module 880 may be included in the input/output interface 140 illustrated in FIG. 4. The audio module 880 may process sound information input or output through at least one of a speaker 882, a receiver 884, an earphone 886, and the microphone 888.

The camera module 899 is a device capable of capturing still and moving images, and according to an embodiment of the present disclosure, the camera module 899 may include one or more image sensors (for example, a front sensor or a rear sensor), a lens (not illustrated), an Image Signal Processor (ISP, not illustrated), or a flash (not illustrated, for example, an LED or a xenon lamp).

The power management module 895 may manage power of the electronic device 800. Although not shown, a Power Management Integrated Circuit (PMIC), a charger IC, or a battery or fuel gauge may be included in the power management module 895.

The PMIC may be mounted in, for example, an IC or a SoC semiconductor. The charging method may be classified into a wired type and a wireless type. The charger IC may charge a battery, and may prevent introduction of an over-voltage or over-current from a charger. According to an embodiment of the present disclosure, the charger IC may include a charger IC for at least one of a wired charging method and a wireless charging method. The wireless charging method may include, for example, a magnetic resonance method, a magnetic induction method, or an electromagnetic wave method, and an additional circuit for wireless charging, for example, a coil loop, a resonance circuit, or a rectifier may be added for the wireless charging method.

The battery gauge measures the remaining capacity of the battery 896, and a voltage, a current, or a temperature of the battery 896 during charging. The battery 896 stores or produces electricity and supplies power to the electronic device 800 by using the stored or produced electricity. The battery 896 may include a rechargeable battery or a solar battery.

The indicator 897 may display a particular state, for example, at least one of a booting state, a message state, and a charging state, of the electronic device 800 or a part thereof (for example, the AP 810). The motor 898 may convert an electric signal into mechanical vibration. Although not shown, a processing unit for supporting mobile TVs (for example, a GPU) may be included in the electronic device 1001. The processing unit for supporting mobile TVs may process media data complying with, for example, Digital Multimedia Broadcasting (DMB), Digital Video Broadcasting (DVB), a media flow, and the like.

The foregoing components of the electronic device may include one or more components, and a name of a component may vary according to a type of the electronic device. The electronic device may include at least one of the foregoing components, and some of them may be omitted from the electronic device or other components may be further included in the electronic device. In addition, some of the components of the electronic device may be combined into one entity to perform the same function as those of the components that have not been combined.

Figure 9:
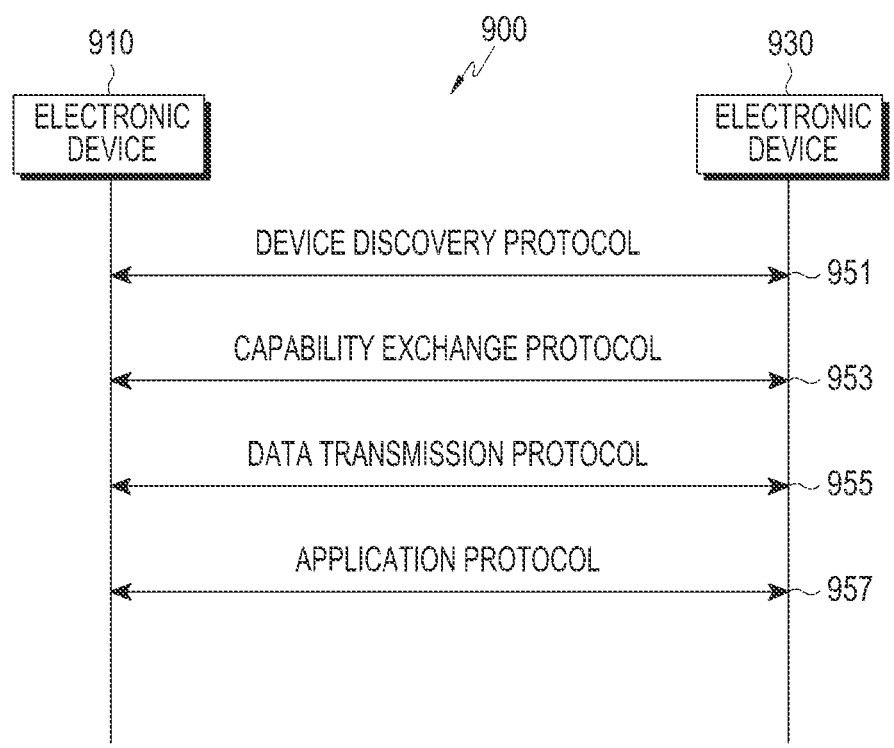
FIG. 9 is a ladder diagram illustrating a communication protocol between a plurality of electronic devices according to an embodiment of the present disclosure.

FIG. 9 is a ladder diagram illustrating a communication protocol between a plurality of electronic devices according to embodiments of the present disclosure.

Referring to FIG. 9, for example, a communication protocol 900 may include a device discovery protocol 951, a capability exchange protocol 953, a data transmission protocol 955, and an application protocol 957.

According to an embodiment of the present disclosure, the device discovery protocol 951 may be a protocol according to which electronic devices (for example, an electronic device 910 or an electronic device 930) detects an external electronic device capable of communicating with the electronic devices or connect to the detected external electronic device. For example, the electronic device 910 (for example, the electronic device 100) may detect the electronic device 930 (for example, the electronic device 103) as a device capable of communicating with the electronic device 910, through a communication method (for example, WiFi, BT, USB, and the like) available in the electronic device 910, by using the device discovery protocol 951. The electronic device 910 may obtain and store identification information regarding the detected electronic device 930 by using the device discovery protocol 951 for communication connection with the electronic device 930. For example, the electronic device 910 may establish communication connection with the electronic device 930 based on at least the identification information.

According to an embodiment of the present disclosure, the device discovery protocol 951 may be a protocol for mutual authentication among a plurality of electronic devices. For example, the electronic device 910 may perform authentication between the electronic device 910 and the electronic device 930 based on communication information (for example, a Media Access Control (MAC) address, a Universally Unique Identifier (UUID), a Subsystem Identification (SSID), and an Internet Protocol (IP) address).

According to an embodiment of the present disclosure, the capability exchange protocol 953 is a protocol for exchanging information associated with a capability of a service that may be supported in at least one of the electronic device 910 and the electronic device 930. For example, the electronic device 910 and the electronic device 930 may exchange information associated with a capability of a service currently provided by each of them through the function exchange protocol 953. The exchangeable information may include identification information indicating a particular service among the plurality of services that may be supported by the electronic device 910 and the electronic device 930. For example, the electronic device 910 may receive identification information of a particular service provided by the electronic device 930 from the electronic device 930 through the capability exchange protocol 953. In this case, the electronic device 910 may determine based on the received identification information whether the electronic device 910 can support the particular service.

According to an embodiment of the present disclosure, the data transmission protocol 955 may be a protocol for controlling a flow of data transmitted and received to provide a service through interworking between electronic devices (for example, the electronic device 910 and the electronic device 930) connected for communication therebetween. For example, at least one selected from among the electronic device 910 and the electronic device 930 may perform error control or data quality control by using the data transmission protocol 955. Additionally or alternatively, the data transmission protocol 955 may determine a transmission format of data transmitted and received between the electronic device 910 and the electronic device 930. At least one selected from the electronic device 910 and the electronic device 930 may manage (for example, connect or terminate) at least a session for data exchange by using the data transmission protocol 955.

According to an embodiment of the present disclosure, the application protocol 957 may be a protocol for providing a procedure or information for exchanging data associated with a service provided to the external electronic device. For example, the electronic device 910 (for example, the electronic device 100) may provide a service to the electronic device 930 (for example, the electronic device 104 or the server 106) through the application protocol 957.

As is apparent from the foregoing description, various embodiments of the present disclosure may prevent the malfunction of the gesture sensor. In addition, various embodiments of the present disclosure may set a light amount threshold, which is set in a gesture sensor to detect presence of an object within an effective distance, variably according to a surrounding environment. Moreover, various embodiments of the present disclosure may set a light amount threshold set in the gesture sensor dynamically or in real time. Furthermore, various embodiments of the present disclosure may minimize a manufacturing defect in manufacturing of the gesture sensor. Moreover, various embodiments may minimize a termination recognition distance deviation by removing the amount of light based on a surrounding environment.

The term "module" used in various embodiments of the present disclosure may refer to a unit including a combination of one or more of hardware, software, and firmware. The "module" may be interchangeably used with a term, such as a unit, logic, a logical block, a component, a circuit, and the like. The "module" may be a minimum unit of parts formed integrally as one piece or a part thereof. The "module" may be a minimum unit that performs one or more functions or a part of the minimum unit. The "module" may be mechanically or electronically implemented. For example, the "module" according to various embodiments of the present disclosure may include at least one of an Application-Specific Integrated Circuit (ASIC) chip, Field-Programmable Gate Arrays (FPGAs), and a programmable-logic device that are well-known or to be developed, which perform certain operations.

According to various embodiments of the present disclosure, at least a part of a device (for example, modules or functions thereof) or a method (for example, operations) according to various embodiments of the present disclosure may be implemented with a command stored in, for example, a computer-readable storage medium in the form of a programming module. When the command is executed by one or more processors (for example, the processor 210), the one or more processors may perform a function corresponding to the command. The computer-readable storage medium may be, for example, the memory 110. At least a part of the programming module may be implemented (for example, executed) by the processor 210. At least a part of the programming module may include at least one of a module, a program, a routine, sets of instructions, and a process to perform one or more functions.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A module or programming module according to various embodiments of the present disclosure may include at least one of the foregoing components, or some of the foregoing components may be omitted or other components may be further included. Operations executed by a module, a programming module, or other components according to various embodiments of the present disclosure may be performed sequentially, in parallel, repetitively, or heuristically. Some operations may be executed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a gesture sensor of an electronic device, the method comprising:
   storing a default light amount threshold and a light amount reference value;
   driving the gesture sensor to detect a light amount measurement with respect to light incident to the gesture sensor;
   comparing the light amount measurement with the light amount reference value;
   determining a weight value based on a result of the comparison; and
   determining, one of the default light amount threshold and a value generated by adding the weight value to the light amount measurement, as a light amount threshold that is used based on object recognition of the gesture sensor.

2. The method of claim 1, further comprising determining the light amount threshold by adding the weight value to the light amount measurement, if the light amount measurement is less than the light amount reference value.

3. The method of claim 1, further comprising determining the default light amount threshold as a light amount threshold of the gesture sensor, if the light amount measurement is greater than the light amount reference value.

4. The method of claim 1, wherein the determining of the light amount threshold of the gesture sensor comprises:
determining a recognition threshold by adding a recognition weight value to the light amount measurement; and
determining a release threshold by adding a release weight value to the light amount measurement.

5. The method of claim 4, wherein the recognition weight value and the release weight value are different values.

6. The method of claim 1, further comprising:
storing the light amount measurement;
driving the gesture sensor to receive the light amount measurement with respect to the light incident to the gesture sensor upon occurrence of a threshold resetting event;
comparing the detected light amount measurement with the stored light amount measurement;
determining the light amount threshold of the gesture sensor by adding a weight value to the detected light amount measurement, if the detected light amount measurement is less than the stored light amount measurement; and
maintaining an existing light amount threshold if the detected light amount measurement is greater than the stored light amount measurement.

7. The method of claim 1, further comprising:
storing the light amount measurement;
driving the gesture sensor to receive the light amount measurement with respect to the light incident to the gesture sensor upon occurrence of the threshold resetting event;
resetting the light amount threshold of the gesture sensor if a difference between the detected light amount measurement and the stored light amount measurement falls beyond an error range;
maintaining an existing light amount threshold if the difference between the detected light amount measurement and the stored light amount measurement falls within the error range; and
stopping resetting the light amount threshold, if a light amount measurement satisfying the error range is detected continuously at least a certain number of times.

8. The method of claim 1, wherein the receiving of the light amount measurement comprises:
emitting light from a light source included in the gesture sensor; and
receiving a light amount measurement with respect to light incident to a light-receiver included in the gesture sensor.

9. The method of claim 8,
wherein the light amount reference value comprises a reference value that is referred to for determination of the light amount threshold of the gesture sensor according to the light amount measurement based on crosstalk of the gesture sensor when the electronic device is turned on, and
wherein the crosstalk indicates light being incident to the light-receiver in spite of absence of the object.

10. A non-transitory computer-readable storage medium for storing a computer program of instructions configured to be readable by at least one processor for instructing the at least one processor to execute a computer process for performing the method of claim 1.

11. An electronic device comprising:
a gesture sensor;
a memory; and
at least one processor configured to:
store a default light amount threshold and a light amount reference value into the memory,
receive a light amount measurement with respect to light incident to the gesture sensor,
compare the light amount measurement with a light amount reference value,
determine a weight value based on a result of the comparison, and
determine, one of the default light amount threshold and a value generated by adding the weight value to the light amount measurement, as a light amount threshold that is used based on object recognition of the gesture sensor.

12. The electronic device of claim 11, wherein the at least one processor is further configured to determine the light amount threshold by adding the weight value to the light amount measurement, if the light amount measurement is less than the light amount reference value.

13. The electronic device of claim 11, wherein the at least one processor is further configured to determine the default light amount threshold as a light amount threshold of the gesture sensor, if the light amount measurement is greater than the light amount reference value.

14. The electronic device of claim 11, wherein, to determine the light amount threshold of the gesture sensor, the at least one processor is further configured to determine a recognition threshold by adding a recognition weight value to the light amount measurement and to determine a release threshold by adding a release weight value to the light amount measurement.

15. The electronic device of claim 14, wherein the recognition weight value and the release weight value are different values.

16. The electronic device of claim 11, wherein the at least one processor is further configured to:
store the light amount measurement,
drive the gesture sensor to receive the light amount measurement with respect to the light incident to the gesture sensor upon occurrence of a threshold resetting event,
compare the detected light amount measurement with the stored light amount measurement,
determine the light amount threshold of the gesture sensor by adding a weight value to the detected light amount measurement if the detected light amount measurement is less than the stored light amount measurement, and
maintain an existing light amount threshold if the detected light amount measurement is greater than the stored light amount measurement.

17. The electronic device of claim 11, wherein the at least one processor is further configured to:
store the light amount measurement,
drive the gesture sensor to receive the light amount measurement with respect to the light incident to the gesture sensor upon occurrence of the threshold resetting event,
reset the light amount threshold of the gesture sensor if a difference between the detected light amount measurement and the stored light amount measurement falls beyond an error range, maintain an existing light amount threshold if the difference between the detected light amount measurement and the stored light amount measurement falls within the error range, and stop resetting the light amount threshold if a light amount measurement satisfying the error range is detected continuously at least a certain number of times.

18. The electronic device of claim 11, wherein the gesture sensor comprises:

a light source configured to emit light; and a light-receiver configured to determine a light amount measurement by measuring the amount of incident light.

19. The electronic device of claim 18, wherein the light amount reference value comprises a reference value that is referred to for determination of the light amount threshold of the gesture sensor according to the light amount measurement based on crosstalk of the gesture sensor when the electronic device is turned on, and wherein the crosstalk indicates light being incident to the light-receiver in spite of absence of the object.

\* \* \* \* \*